United States Patent [19]

Wada et al.

[11] 4,052,358
[45] Oct. 4, 1977

[54] PIGMENTABLE LOW-SHRINKAGE UNSATURATED POLYESTER RESIN COMPOSITION

[75] Inventors: Moriyasu Wada, Kanagawa; Katuya Kumagai; Takashi Kamo, both of Kawasaki, all of Japan

[73] Assignees: Tokyo Shibaura Electric Co., Ltd., Kawasaki; Toshiba Chemical Products Co., Ltd., Tokyo, both of Japan

[21] Appl. No.: 659,583

[22] Filed: Feb. 19, 1976

[30] Foreign Application Priority Data

Mar. 5, 1975 Japan .................. 50-26031

[51] Int. Cl.² ...................... C08K 7/14; C08L 67/06
[52] U.S. Cl. .................. 260/40 R; 260/75 UA; 260/862
[58] Field of Search .............. 260/75 UA, 862, 40 R

[56] References Cited

U.S. PATENT DOCUMENTS

| 3,503,921 | 3/1970 | Souza et al. | 260/862 X |
| 3,533,999 | 10/1970 | Fekete et al. | 260/75 UA |
| 3,560,445 | 2/1971 | Fekete et al. | 260/75 UA |
| 3,830,875 | 8/1974 | Meincke et al. | 260/862 |

FOREIGN PATENT DOCUMENTS 1,213,992   4/1966   Germany

Primary Examiner—Howard E. Schain
Assistant Examiner—W. C. Danison, Jr.
Attorney, Agent, or Firm—Oblon, Fisher, Spivak, McClelland & Maier

[57] ABSTRACT

An unsaturated polyester resin composition comprises a mixture of a particular unsaturated polyester, an unsaturated monomer copolymerizable with the unsaturated polyester and polystyrene having a certain particle size in specific amounts. The unsaturated polyester is a reaction product of a dicarboxylic acid component containing $\alpha,\beta$-unsaturated dicarboxylic acid with a glycol component containing certain amounts of neopentyl glycol and 2,2-bis(4-hydroxycyclohexyl) propane. The resin composition exhibits favorable properties such as low shrinkage upon curing, good colorability and good storage stability, and is useful particularly in formulating premixed molding compounds.

9 Claims, No Drawings

PIGMENTABLE LOW-SHRINKAGE UNSATURATED POLYESTER RESIN COMPOSITION

BACKGROUND OF THE INVENTION

1. Field of the Invention

This invention relates to a low-shrinkage unsaturated polyester resin composition having good colorability and good storage stability, and more particularly to such resin composition including in specific amounts a particular unsaturated polyester, an unsaturated monomer copolymerizable with the unsaturated polyester, and polystyrene having a certain particle size, said unsaturated polyester being a reaction product of a glycol component containing certain amounts of neopentyl glycol and 2,2-bis(4-hydroxycyclohexyl) propane with a dicarboxylic acid comprising α, β-unsaturated dicarboxylic acid.

2. Description of the Prior Art

Generally, an unsaturated polyester exhibits a volume shrinkage of about 10% upon curing, and, even when prepared into a premixed molding compound, exhibits a mold shrinkage of about 0.2 to 0.6% (as measured in accordance with Japanese Industrial Standard K 6911). A molding material having such a mold shrinkage is not suitable to the preparation of a molding of high dimensional precision, and further, in the case of molding a middle- or large-sized no-fuse breaker housing, or performing a metal insertion-molding as in a slip ring for a motor, cracks occur in the resulting moldings due to the cure shrinkage of the molding material or the difference in coefficient of expansion between the metal and the molding material. In order to reduce the volume shrinkage of the unsaturated polyester due to curing thereof, a vinyl polymer, a vinyl polymer having an acid functional group such as a copolymer of acrylic acid with styrene or vinyl chloride, or amorphous linear saturated polyester are conventionally added as additional components to the unsaturated polyester resin. Although a desired effect is obtained in respect of volume shrinkage-reduction in any of these cases, the unsaturated polyester resin composition containing the additional components has low colorability to a colorant and the additional components are made optically ununiform upon curing to become whitish, or to come out on the surface of the resulting molding to form coloring ununiformness thereon.

To avoid the above-mentioned coloring ununiformness or unevenness, an attempt is made to use an extremely excessive amount of a pigment or dye, for example, to use, based on the resin content, about 2.0% of carbon pigment, which is 5 to 10 times as large as the percentage in the usual case. But, such an attempt results in a decrease in the electrical and mechanical characteristics of the resulting molding, or in a decrease in the storage stability of the resin composition itself or a premix thereof. It is also known that in order to prevent the coloring ununiformness, a thermoplastic resin is added as a third component to the unsaturated polyester resin, oxides or hydroxides of magnesium, calcium or the like are added thereto to chemically denature a terminal carboxyl group in the unsaturated polyester, or a graft pigment whose surface is graft-polymerized with vinyl monomer such as a graft carbon is used as an adding pigment. However, addition of the thermoplastic resin is not very effective, addition of said oxides or hydroxides causes a substantial increase in the cure shrinkage of the unsaturated polyester resin composition, and particularly in the case where this resin composition is molded into molding with heavy cross section, causes the occurrence of inner cracks, and further addition of said graft pigment fails to decrease the shrinkage of the resin composition.

SUMMARY OF THE INVENTION

An object of the invention is to provide an unsaturated polyester resin composition having low cure shrinkage and excellent colorability and storage stability.

Another object of the invention is to provide an unsaturated polyester resin composition suitable to the preparation of a premixed molding compound.

These and other objects which will be apparent from the following description are attained by a low-shrinkage unsaturated polyester resin composition comprising a mixture of 25 to 70% by weight of unsaturated polyester based on a reaction product of a dicarboxylic acid component comprising αβ-unsaturated dicarboxylic acid with a glycol component comprising, on the basis of the total amount of the glycol component, 15 to 70 mol% of neopentyl glycol and 10 to 30 mol% of 2,2-bis(4-hydroxycyclohexyl) propane; 60 to 18% by weight of unsaturated monomer copolymerizable with the unsaturated polyester; and 45 to 4% by weight of polystyrene having such a particle size as to pass through a 50-mesh screen.

DETAILED DESCRIPTION OF THE PREFERRED EMBODIMENTS

A mixture contained in a resin composition of the invention comprises 25 to 70% by weight of particular unsaturated polyester. This unsaturated polyester is obtained by reaction of dicarboxylic acid component containing α,β-unsaturated dicarboxylic acid with a glycol component as described hereinafter.

The αβ-unsaturated dicarboxylic acid may be of any type generally used to form an unsaturated polyester. The αβ-unsaturated dicarboxylic acid includes, for example, maleic anhydride, fumaric acid, itaconic acid, or mixtures thereof. Above all, the maleic anhydride is preferable. Though the dicarboxylic acid component is preferred to consist substantially only of the αβ-unsaturated dicarboxylic acid, it may contain, if desired, a saturated dicarboxylic acid such as phthalic acid, isophthalic acid, chlorendic acid (HET acid), or tetrabromophthalic anhydride up to 15 mol% or preferably up to 10% based on the total amount of the dicarboxylic acid component.

The glycol component used to form the unsaturated polyester contains, on the basis of the total amount of the glycol component, 15 to 70 mol%, or preferably 25 to 70 mol% of neopentyl glycol and 10 to 30 mol%, or preferably 10 to 20 mol% of 2,2-bis(4-hydroxycyclohexyl) propane. As well known, this substituted propane is obtained by hydrogenating bisphenol A and expressed by the formula

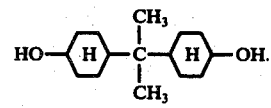

Hereinafter, this substituted propane is sometimes referred to as "hydrogenated bisphenol A". In almost all cases, said glycol component further contains, on the basis of the total amount of the glycol component, 1 to 15mol% of other conventional glycols including those having branched alkyl groups such as propylene glycol, 3-methyll, 5-pentanediol, 2-methyl-1,4-butanediol, or isopentyl glycol and straight-chain glycols such as 1,5-pentanediol, diethylene glycol or dipropylene glycol. Similarly, said glycol component may contain 1 to 15 mol% of polyhydric alcohols such as pentaerithlitol or glycerine, preferably 3 to 15 mol% of glycerine. Preferred as other alcohol components are glycols having branched alkyl group or more particularly propylene glycol.

Where the neopentyl glycol content in the glycol component is less than 15 mol%, a resin composition obtained from the resulting unsaturated polyester is little recognized to have elevated colorability. Where the neopentyl glycol content is more than 70 mol%, crystallization occurs in the resulting unsaturated polyester, which causes a decrease in the storage stability of the resulting resin composition or a premix thereof. Where the substituted propane content in the glycol component is less than 10 mol%, crystallization partially occurs in the resulting unsaturated polyester, which causes a decrease in the storage stability of the resulting resin composition or a premix thereof, for which reason this composition or premix is very inconvenient to handle. Where the substituted propane content is more than 30 mol%, the curing reaction characteristic of the resulting unsaturated polyester is deteriorated though the storage stability of the resin composition is increased, so that when this composition is formed into a premix, the mold-releaseability of this premix becomes lower and this premix is also prevented from having low shrinkage, failing to obtain a molding having good surface smoothness. Even when a large amount of internal mold-releasing agent such as zinc stearate is added for improving the mold-releasability, it comes out, or is relieved, on the surface of the resulting molding to decrease the gloss characteristic thereof.

The unsaturated polyester used to prepare the resin composition of the invention is formed by a conventional method from the dicarboxylic acid component and the glycol component. Thus, the dicarboxylic acid component and glycol component are reacted in the molar ratio 1:1 or usually 1:1.01 to 1:1.1 at a temperature of 130° to 220° C in an atmosphere of inert gas such as nitrogen or carbon dioxide to obtain the desired unsaturated polyester. This unsaturated polyester usually has a molecular weight of about 800 to 2500 and an acid value of about 15 to 35.

The above-mentioned mixture contained in the resin composition of the invention further compriss 60 to 18% by weight of unsaturated monomer copolymerizable with said unsaturated polyester. This unsaturated monomer is capable of dissolving the polystyrene which is hereinafter described, and includes vinyl compounds such as styrene, vinyl toluene, o-, m- or p-chlorostyrene, methyl methacrylate, or methyl acrylate, and allyl compounds such as diallyl phthalate, diallyl isophthalate, triallyl isocyanurate, or triallyl trimellitate, and mixtures of any two of these compounds. Preferable are the compounds having high solubility of polystyrene therein such as styrene, vinyl toluene or chlorostyrenes. Particularly preferable is styrene. The amount of the unsaturated monomer is preferred to account for 35 to 54% by weight of the total amount of the unsaturated monomer and the unsaturated polyester.

The above-mentioned mixture contained in the resin composition of the invention further comprises 45 to 4% by weight or preferably 40 to 8% by weight, of polystyrene. The word "polystyrene" includes general purpose polystyrene and butadiene-modified polystyrene, and has a molecular weight of 100,000 to 200,000. Where used in this invention, the "polystyrene" is not relieved on the resulting molding surface to produce coloring unevenness, which is possible with other thermoplastic resins such as acrylic resin and saturated polyester. The polystyrene is a powdery or particular one having such a particle size as to pass through a 50-mesh screen. The polystyrene having a particle size larger than this one has low solubility in the unsaturated monomer to come out on the resulting molding surface to cause a damage to the appearance of this resulting molding and further to fail to be uniformly mixed with, for example, fillers or pigments. The "polystyrene" having said particle size may be the one which is taken out from an intermediate process carried out by the emulsion polymerization method, and includes, for example, the ones which are commercially available from the Mitsui Toatsu Chemicals, Inc. under the trade name of Toporex 525-01, Toporex 550-02, Toporex 825-21, Toporex 850-51 and Toporex 855-51. In the preferred embodiments of the invention, when 40 to 8% by weight of polystyrene is contained in said mixture, the amount of the unsaturated monomer is 35 to 58% by weight based on the total amount of the unsaturated polyester and the unsaturated monomer.

It should be noted that said unsaturated polyester, 25 to 70% by weight, said unsaturated monomer, 60 to 18% by weight, and said polystyrene, 45 to 4% by weight, totally constitute said mixture, 100% by weight.

Where the unsaturated polyester content in said mixture is less than 25 weight %, the amount of the unsaturated monomer copolymerizable with the unsaturated polyester becomes extremely larger than the stoichiometric amount. For this reason, an unreacted monomer remains in the resulting molding to cause a deterioration of the workability and physical property of the resulting molding, and it becomes substantially impossible to mix the resulting resin composition with a filler and/or reinforcing fiber which may be further added. Where said unsaturated polyester content is more than 70 weight %, the resulting molding material becomes viscous due to this polyester being too much, or the amount of the unsaturated monomer copolymerizable with the unsaturated polyester becomes extremely smaller than the stoichiometric amount. For this reason, the temperature at which the resulting molding is to be thermally changed in shape becomes low, the electrical characteristics of the resulting molding are remarkably decreased, and a sufficient reduction in shrinkage of the resulting resin composition is not achieved.

Where said unsaturated monomer content in said mixture is outside the range of 60 to 18 weight %, desired effects cannot be obtained in respect of shrinkage reduction, colorability, workability or moldability of the resulting resin composition.

Where said polystyrene content in said mixture is more than 45 weight %, it is relieved on the surface of the resulting molding, or the thermal property of the resulting molding is deteriorated, or the colorability of the resulting resin composition is decreased. Where said polystyrene is less than 4 weight %, the resulting resin is disabled from being decreased in shrinkage.

The resin composition of the invention may contain a conventional pigment, dye or inorganic filler in addition to said unsaturated polyester, unsaturated monomer and polystyrene.

The resin composition of the invention has excellent colorability, workability, and storage stability, and is cured by being heated at 120° to 170° C in the presence of a curing agent such as benzoyl peroxide, tert-butyl peroxybenzoate, or dicumyl peroxide. The volume shrinkage of this resin composition upon heat-curing is as small as 0 to about 2.0%.

The resin composition of the invention is suitable particularly to the preparation of the premix such as a bulk molding compound (BMC), sheet molding compound (SMC) or the like, that is, a premixed molding compound, Namely, by adding to the resin composition a curing agent, filler, or colorant and a reinforcing material such as glass chopped strand or glass mat a BMC compound having a glass content of 20 to 30% or an SMC compound having a glass content of 30 to 40% is obtained. The BMC and SMC compounds contain 18 to 35% and 25 to 40% by weight of the resin composition of the invention, respectively. These premixes containing the resin composition of the invention have a cure shrinkage of only 0 to about 0.2% to provide a molding having no coloring ununiformness. Such premixed molding compounds also fall within the scope of the invention.

As described above, the resin composition and premix molding compound of the invention can provide a molding having good dimensional precision and stability, and also excellent electrical characteristics and good surface smoothness as well as no crack and coloring ununiformness. Further, since those composition and compound have a hydrogenated bisphenol nucleus in the molecule of the unsaturated polyester, the resulting molding has excellent hot water resistance and in addition high chemicals-resistance such as erosion resistance.

This invention will be more fully understood from the following examples. In the examples, all percentages are expressed as "percentages by weight" and all parts as "parts by weight," unless otherwise indicated.

EXAMPLE 1

A glycol component consisting of 6 mols of neopentyl glycol, 1 mol of hydrogenated bisphenol A and 3.3 mols of propylene glycol (including an excessive amount of 0.3 mol) was reacted with 10 mols of maleic anhydride at a temperature of 120° to 200° C in an atmosphere of nitrogen gas to form an unsaturated polyester having an acid value of 28 and a molecular weight of about 1200. Subsequently, the unsaturated polyester thus obtained was dissolved in a styrene monomer to prepare a solution having a resin content of 70% and this solution was added with 300 ppm of hydroquinone as a polymerization inhibitor to prepare a resin solution A.

For comparison, in the same manner as mentioned above 10.3 mols of propylene glycol was reacted with 10 mols of maleic anhydride to prepare an unsaturated polyester having an acid value of 26. The unsaturated polyester thus obtained was dissolved in a styrene monomer to prepare a solution having a resin content of 70% and this solution was added with 300 ppm of hydroquinone to prepare a resin solution B.

The resin solutions A and B were added with lots of additional styrene monomer, bead polystyrene, Toporex 550-02, carbon black powder, calcium carbonate S-LITE 1200 (manufactured by Nitto Funka Kogyo K. K.), mold-releasing agent, curing or glass fiber, individually in amounts (parts) shown in Table 1, to prepare unsaturated polyester resin composition and BMC compounds.

Table 1

| Specimen No. Components | Ex. 1a | Ex. 1b | Ref. 1 | Ref. 2** | Ref. 3** |
|---|---|---|---|---|---|
| Resin solution A | 20.0 | 20.0 | — | 14.4 | — |
| Resin solution B | — | — | 20.0 | — | 14.4 |
| Toporex 550-02 (having a particle size to pass through a 50-mesh screen) | 5.0 | 6.0 | 6.0 | — | — |
| Bead polystyrene (having a particle size remained on a 50-mesh screen) | — | — | — | 3.8 | 3.8 |
| Additional styrene monomer | 4.0 | 4.0 | 4.0 | 5.8 | 5.8 |
| S-LITE 1200 | — | 53.0 | 53.0 | 59 | 59 |
| Zinc stearate (as a mold-releasing agent) | — | 1.3 | 1.3 | 1.3 | 1.3 |
| Carbon black (as a pigment) | — | 0.4 | 0.4 | 0.4 | 0.4 |
| ¼ inch glass fiber | — | 15.0 | 15.0 | 15.0 | 15.0 |
| Tert-butyl peroxybenzoate | 0.3 | 0.3 | 0.3 | 0.3 | 0.3 |
| Shrinkage (% by vol.) | 1.2* | 0.09 | 0.08 | 0.07 | 0.07 |

*The shrinkage was measured in accordance with the specific gravity method.
**These premixes were prepared using a solution obtained by beforehand dissolving polystyrene in the additional styrene monomer.

Using the resin composition (Ex. 1a) and BMC compounds (Ex.1b and Refs. 1 to 3), a breaker housing having a thickness of 2.5 mm and the dimension of 80 × 200 × 120 mm was prepared by injection molding at a mold temperature of 150° C under a pressure of 110 to 120 kg/cm² for 2 minutes, and a plate of the dimension 5 × 300 mm was prepared by compression molding at 145° C under a pressure of 100 kg/cm² for 2 minutes. When these moldings were investigated, the moldings of the invention (Ex. 1b) had good surface smoothness and mold-releasability and the molding of Ex. 1b was uniformly colored black. In the moldings of Refs. 1 to 3, the polystyrene and mold-releasing agent were relieved over a surface area corresponding to 2/5 of the entire surface of the molding, and gloss unevenness and coloring uniformness were recognized. Further, the extent to which the moldings of Refs. 1 to 3 were colored black was by far smaller than that in the case of the moldings of the invention, and cracks occurred along weld lines.

Further, with respect to said BMC compounds, the cure shrinkage was measured in accordance with the method of JIS K-6911, the results being presented together in Table 1. Cure shrinkage of the resin composition (Ex. 1a) is also shown in Table 1.

As will be understood from the foregoing description, the resin composition of the invention is as good as that of the References in respect of shrinkage, and therefore poses no problems even when put to practical use, and further is far more excellent than that of the References in respect of colorability.

Further, for comparison, a BMC compound was prepared in the same manner as in Example 1b except that a bead acrylic resin BR-50 (manufactured by the Mistubishi Rayon Co., Ltd. under this trade name) having a particle size passing through a 50-mesh was used in replacement of the Toporex 550-02, and a molding was prepared in the same manner as mentioned above. This molding presented bad gloss, and coloring unevenness to have a degrading appearance.

EXAMPLE 2

A glycol component consisting of neopentyl glycol, hydrogenated bisphenol A and propylene glycol was reacted with fumaric acid or maleic anhydride in the molar proportion presented in Table 2 in accordance with the process of Example 1 to form nine kinds of unsaturated polyester having a molecular weight of 1800 to 2200 (as measured by the end-group determination).

Table 2

| Specimen No. Components | Examples of the Invention | | | | | References | | | |
|---|---|---|---|---|---|---|---|---|---|
| | 2a | 2b | 2c | 2d | 4 | 5 | 6 | 7 | 8 |
| Neopentyl glycol | 3 | 6 | 7 | 5 | 6 | 7 | 7 | 6 | 4 |
| Hydrogenated bisphenol A | 1.5 | 1.0 | 2.5 | 3 | 0.5 | — | — | — | 4 |
| Propylene glycol | 5.5 | 3.0 | 0.5 | 2 | 3.5 | 3 | 3 | 4 | 2 |
| Maleic anhydride | — | 10 | 10 | — | 10 | 10 | 10 | — | — |
| Fumaric acid | 10 | — | — | 10 | — | — | — | 10 | 10 |

Note: Upon reaction, 0.3 mol of propylene glycol was further added in excess.

Each of the nine kinds of unsaturated polyester thus obtained was dissolved in a styrene monomer to prepare a 70% resin solution. Each of the solution was added with 300 ppm of hydroquinone. When each of the resin solution was sampled in a transparent container and received in a constant temperature bath kept at 35 ± 1° C and the storability was tested, any one of the resin components of the invention was not crystallized even in six months or more, whereas any one of the resin components of the References (except for the references 6 and 8) began to crystallize within a week.

Seven parts of bead polystyrene Toporex 855-51 having a particle size passing through a 60-mesh screen, 54 parts of calcium carbonate SS80 (manufactured by the Nitto Funka Kogyo K. K. under this trade name), 2.0 parts of zinc stearate and 0.4 part of carbon black were kneaded with each other by a kneader for 10 minutes. The mass was added with 20 parts of resin solution obtained as above, 4 parts of additional styrene monomer and 0.3 part of tert-butyl peroxybenzoate, and the resulting mass was kneaded for 30 minutes. To this mass was added 15 parts of ¼ inch glass fiber and kneading was carried out to prepare nine corresponding lots of BMC compound.

A housing similar to that of Example 1 was prepared using each of the BMC compound lots by injection molding and transfer molding. All the moldings of the invention were excellent in respect of surface smoothness, colorability, and mold-releasability. Note that though the unsaturated polyester of References 6 and 8 had good storage stability, the BMC compound prepared from said polyester only provides a molding having high shrinkage and bad surface smoothness and extremely bad mold-releasability.

EXAMPLE 3

In accordance with the process of Example 1, a glycol component comprising neopentyl glycol, hydrogenated bisphenol A and other glycols was reacted with maleic anhydride or fumaric acid in the molar proportion presented in Table 3 to form seven kinds of unsaturated polyester. The acid values of these unsaturated polyesters are listed also in Table 3.

Table 3

| Specimen No. Components | 3A | 3B | 3C | 3D | 3E | 3F | 3G |
|---|---|---|---|---|---|---|---|
| Neopentyl glycol | 7.0 | 6.0 | 5.0 | 6.0 | 7.0 | 3.0 | 1.5 |
| Hydrogenated bisphenol A | 2.0 | 3.0 | 1.0 | 1.0 | 2.0 | 1.5 | 2.0 |
| Propylene glycol | — | — | 3.0 | 2.0 | — | 3.0 | 2.0 |
| Pentanediol | — | — | 1.0 | — | — | — | — |
| 2-metyl butanediol | 1.0 | — | — | — | — | 2.5 | 4.5 |
| Dipropylene glycol | — | — | — | 1.0 | 1.0 | — | — |
| Diethylene glycol | — | 1.0 | — | — | — | — | — |
| Maleic anhydride | 10 | 10 | 10 | 10 | 10 | — | — |
| Fumaric acid | — | — | — | — | — | 10 | 10 |
| Acid value | 28 | 28 | 25 | 27 | 24 | 28 | 26 |

Each of these unsaturated polyesters was added with a styrene monomer to prepare a 70% resin solution, which was further added with 300 ppm of hydroquinone.

51 parts of calcium carbonate NCC 410 (manufactured Nitto Funka Kogyo K.K. and put on sale under this trade name), 1.5 parts of zinc stearate, 0.4 part of carbon black and 80 parts of bead polystyrene Toporex 850-51 having a particle size passing through a 60-mesh screen were kneaded by a kneader for 10 minutes. The mass was added with 18 parts of resin solution obtained as above, 4 parts of additional styrene monomer and 0.3 part of tert-butyl peroxybenzoate, and kneading was carried out for 30 minutes. The resulting mass was further blended with 8 parts of ¼-inch silane-treated glass fiber to prepare seven corresponding lots of BMC compound. The BMC compound thus obtained had as low a shrinkage as 0.08% (as measured by the method of JIS K-6911) and good storage stability, and all of the moldings prepared by compression molding similarly to Example 1 had good surface smoothness and mold-releasability and no cracks and/or coloring ununiformness. Thus, these moldings were much more excellent than the moldings prepared in References 1 to 3.

EXAMPLE 4

A glycol component consisting of 5.0 mols of neopentyl glycol, 1.5 mols of hydrogenated bisphenol A and 3.8 mols of 2-methyl butanediol was reacted with 10 mols of maleic anhydride at 120° to 220° C in an atmosphere of nitrogen gas to form an unsaturated polyester having an acid value of 23. Subsequently, this polyester was added with 250 ppm of hydroquinone and a styrene monomer to prepare a 70% resin solution.

For comparison, an unsaturated polyester (having an acid value of 26) was formed in the same manner as mentioned above except that propylene glycol was used in place of neopentyl glycol, and thereafter another 70% resin solution was similarly prepared.

20 parts of each of the resin solutions as obtained above were added with 4 parts of additional styrene monomer, 6 parts of Toporex 550-02, 53 parts of calcium carbonate S-LITE 1200, 1.3 parts of zinc stearate, 0.4 part of carbon black, 15 parts of ¼-inch glass fiber, and 0.3 part of tert-butyl peroxybenzoate, and the mass was kneaded to prepare two corresponding lots of BMC compound.

Using each of said two lots of BMC compound, a casing for use in safety breaker was prepared by injection molding. The molding of the invention was good in respect of both surface smoothness and mold-releasability and exhibits an excellent appearance, whereas the molding of the comparison presented color unevenness and polystyrene reliefs over a surface area corresponding to about one-third of the entire surface of the molding, that is, had no good appearance.

EXAMPLE 5

In accordance with the process of Example 1, a glycol component consisting of 3.0 mols of neopentyl glycol, 1.5 mols of hydrogenated bisphenol A and 6.0 mols of propylene glycol was reacted with 10 mols of maleic anhydride to form an unsaturated polyester (having an acid value of 25). The mass was added with 250 ppm of hydroquinone and a styrene monomer to prepare a 70% resin solution.

40 parts of aluminum hydroxide HIGILITE H-32 (manufactured by Showa Denko K. K. and put on sale under this trade name), 20 parts of calcium carbonate S-LITE 1200, 1.5 parts of zinc stearate, 0.05 part of carbon black, 0.03 part of titanium white and 3 parts of polystyrene having a particle size passing through a 50-mesh screen were kneaded by a kneader equipped with sigma type blades for 10 minutes. The mass was added with a mixture consisting of 22 parts of said resin solution and 0.35 part of tert-butyl peroxybenzoate, and kneading was carried out for 25 minutes. The mass thus kneaded was further blended with 13 parts of ¼-inch glass fiber to prepare a grey-colored BMC compound.

From this BMC compound a moding was prepared by transfer molding process. This molding had good surface smoothness and no color unevenness, and further its gloss and mold-releasability were good. Further, measurement was made of the cure shrinkage of the BMC compound in accordance with the method of JIS K 6911, the result being only 0.18%.

For comparison, another BMC compound was prepared in the same manner as mentioned above except that the resin solution B prepared in Example 1 as used in replacement of said unsaturated polyester solution; and a mixed powder of stearic acid- carbon black - titanium white was used as a pigment and dispersed in the resin solution B. A molding obtained from this BMC compound by transfer molding process had a cloudy gloss unevenness over a surface area corresponding to about one-third of the entire surface of the molding and turned out to be irresistible to practical use.

EXAMPLE 6

7 mols of neopentyl glycol, 2 mols of hydrogenated bisphenol A, 0.8 mols of glycerine and 0.5 mol of propylene glycol (including 0.3 mol in excess) were reacted with 10 mols of maleic anhydride in streams of nitrogen gas at 120° to 205° C for 15 hours to form an unsaturated polyester having an acid value of 30. After added with 300 ppm of hydroquinone as a polymerization inhibitor, said polyester was dissolved in a styrene monomer to prepare a 50% resin solution. The viscosity of this resin solution was 4.8 poise at 25° C as measured by a B type viscosimeter.

Said resin solution, 85 parts, was added with 15 parts of bead polystyrene having a particle size to pass through a 50-mesh screen (this bead polystyrene had a melt index of 3.0 as measured in accordance with the method of ASTM D 1238 at 200° C under a load of 5000 g), 1.2 parts of tert-butyl peroxybenzoate, 0.8 part of magnesium oxide KYOMAG 40 (manufactured by Kyowa Chemical Industry Co., Ltd. under this trade name), 0.2 part of TR COLOR 2451 BLUE (Toyo Ink Mfg. Co., Ltd.) and 15 parts of calcium carbonate, to prepare a colored compound.

Using this colored compound, a sheet molding compound having a glass content of 35% was prepared by a conventional method, and from this compound was prepared a plate-like molding having a dimension of 1000 × 1000 × 5 mm. This molding had excellent surface smoothness and gloss property, and in addition had no color unevenness.

What we claim is:

1. A pigmentable low-shrinkage unsaturated polyester resin composition comprising a mixture of:
   25 to 70% by weight of unsaturated polyester based on a reaction product of a dicarboxylic acid component comprising α,β-unsaturated dicarboxylic acid with a glycol component comprising, on the basis of the total amount of the glycol component, 15 to 70 mol% of neopentyl glycol and 10 to 30 mol% of 2,2-bis(4-hydroxycyclohexyl) propane;
   60 to 18% by weight of unsaturated monomer copolymerizable with the unsaturated polyester; and
   45 to 4% by weight of polystyrene or a butadiene modified polystyrene having such a particle size as to pass through a 50-mesh screen.

2. The composition of claim 1, wherein the dicarboxylic acid component contains an additional saturated dicarboxylic acid up to 15 mol%.

3. The composition of claim 1, wherein the unsaturated monomer is present in the range of 35 to 54% by weight of the total amount of the unsaturated polyester and the unsaturated monomer.

4. The composition of claim 1, wherein the polystyrene is present in the range of 40 to 8% by weight of the mixture, and the unsaturated monomer is present in the range of 35 to 58% by weight of the total amount of the unsaturated polyester and the unsaturated monomer.

5. The composition of claim 3, wherein the glycol component further comprises 1 to 15 mol% of supplemental polyhydric alcohol selected from the group consisting of propylene glycol, 3-methyl-1,5-pentanediol, 2-metyl-1,4-butanediol, isopentyl glycol, 1,5-pentanediol, diethylene glycol, dipropylene glycol, pentaerithlitol, glycerine and mixtures thereof.

6. The composition of claim 5, wherein the supplemental polyhydric alcohol is propylene glycol.

7. The composition of claim 6, wherein the dicarboxylic acid component is α,β-unsaturated dicarboxylic acid selected from the group consisting of maleic anhydride, fumaric acid, itaconic acid and mixtures thereof.

8. A bulk molding compound comprising 18 to 35% by weight of composition of claim 7 and 5 to 30% by weight of glass fibers.

9. A sheet molding compound comprising 25 to 40% by weight of composition of claim 7 and 20 to 40% by weight of glass fibers.

* * * * *